(12) United States Patent
Broers et al.

(10) Patent No.: US 10,234,117 B2
(45) Date of Patent: Mar. 19, 2019

(54) STADIUM LIGHTING AIMING SYSTEM AND METHOD

(71) Applicant: PHILIPS LIGHTING HOLDING B.V., Eindhoven (NL)

(72) Inventors: Harry Broers, Eindhoven (NL); Ruben Rajagopalan, Eindhoven (NL); Wei Pien Lee, Eindhoven (NL); Chris Damkat, Eindhoven (NL); Bart Andre Salters, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 205 days.

(21) Appl. No.: 15/326,418

(22) PCT Filed: Jul. 6, 2015

(86) PCT No.: PCT/EP2015/065281
§ 371 (c)(1),
(2) Date: Jan. 13, 2017

(87) PCT Pub. No.: WO2016/008746
PCT Pub. Date: Jan. 21, 2016

(65) Prior Publication Data
US 2017/0205061 A1   Jul. 20, 2017

(30) Foreign Application Priority Data

Jul. 17, 2014 (EP) .................................. 14177435

(51) Int. Cl.
*F21V 21/15* (2006.01)
*H05B 37/02* (2006.01)
(Continued)

(52) U.S. Cl.
CPC ............ *F21V 21/15* (2013.01); *G06K 9/4604* (2013.01); *G06T 7/70* (2017.01); *H04N 7/183* (2013.01);
(Continued)

(58) Field of Classification Search
None
See application file for complete search history.

(56) References Cited

U.S. PATENT DOCUMENTS 4,450,507 A    5/1984   Grodin
8,717,552 B1   5/2014   Gordin et al.
(Continued)

FOREIGN PATENT DOCUMENTS

WO    2004086454 A2    10/2004
WO    2006078696 A2    7/2006
WO    2013068861 A1    5/2013

*Primary Examiner* — William B Perkey

(57) ABSTRACT

A lighting aiming system for aiming a stadium lighting system, the lighting aiming system comprising: a luminaire (5), the luminaire having a mounting position and an orientation and configured to generate a light beam along an optical axis; a camera (1) configured to capture an image, the camera (1) coupled to the luminaire and having a defined relationship between a field of view of the camera and the optical axis; a memory (31) configured to store lighting information comprising a desired aiming location of the luminaire, and the memory further configured to store feature information comprising an expected location of at least one feature; a processor (33) configured to determine and output aiming information based on the feature information, lighting information and image to enable a determination on whether the luminaire is correctly aimed.

15 Claims, 7 Drawing Sheets

(51) Int. Cl.
  *G06T 7/00* (2017.01)
  *G06K 9/46* (2006.01)
  *H04N 7/18* (2006.01)
  *G06T 7/70* (2017.01)
  *F21W 131/105* (2006.01)

(52) U.S. Cl.
  CPC ....... *H05B 37/029* (2013.01); *H05B 37/0227* (2013.01); *F21W 2131/105* (2013.01)

(56) References Cited

U.S. PATENT DOCUMENTS

| | | |
|---|---|---|
| 2006/0176698 A1 | 8/2006 | Gordin et al. |
| 2006/0262540 A1 | 11/2006 | Stahl |
| 2010/0026624 A1* | 2/2010 | Bell ................ G06F 3/011 345/156 |
| 2013/0223625 A1 | 8/2013 | De Waal et al. |
| 2013/0258655 A1 | 10/2013 | Wendt |
| 2013/0268246 A1 | 10/2013 | Gordin |
| 2015/0308642 A1* | 10/2015 | Vo ................ H04N 5/2256 362/648 |
| 2017/0171541 A1* | 6/2017 | Shih ................ G03B 15/03 |
| 2017/0184289 A1* | 6/2017 | Nolan ............... F21V 21/15 |
| 2017/0238396 A1* | 8/2017 | Knibbe ............ H05B 33/0854 315/151 |
| 2017/0367785 A1* | 12/2017 | Munari ............ H05B 33/0854 |
| 2018/0033158 A1* | 2/2018 | Campbell .......... G06K 9/00664 |

\* cited by examiner

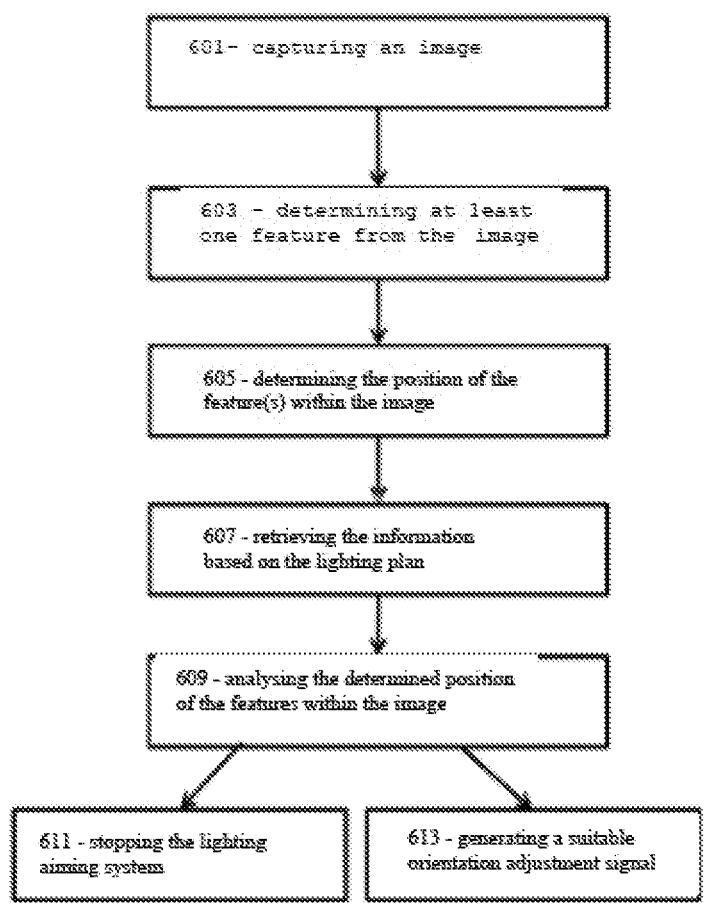

ively lighting applications, such as
those utilising Philips ArenaVision products for example, a
large number of luminaires are distributed around an area to
STADIUM LIGHTING AIMING SYSTEM AND METHOD

CROSS-REFERENCE TO PRIOR APPLICATIONS

This application is the U.S. National Phase application under 35 U.S.C. § 371 of International Application No. PCT/EP2015/065281, filed on Jul. 6, 2015, which claims the benefit of European Patent Application No. 14177435.6, filed on Jul. 17, 2014. These applications are hereby incorporated by reference herein.

FIELD OF THE INVENTION

This invention is generally related to a lighting aiming system and method, and in particular a lighting aiming system and method which is compatible with large area lighting systems.

BACKGROUND OF THE INVENTION

In many high-end large-area lighting applications, such as those utilising Philips ArenaVision products for example, a large number of luminaires are distributed around an area to be illuminated in an attempt to create a uniform light intensity across said given area. Examples of such applications include arena lighting systems for illuminating sports arenas, e.g. field, pitch or stadium lighting, façade lighting, shop floor lighting, parking lot lighting and so on.

A football stadium, for example, may have a lighting plan or design where the lighting system contains more than 100 luminaires each located on the stadium and with a desired aiming location or point on the pitch to attempt to provide a suitable lighting effect. Typically the lighting system installer receives a light plan which contains, for each luminaire, information such as the type of luminaire, the mounting location and orientation of the luminaire, and the aiming location or point (typically relative to the centre of the field). Based on this information the installer mounts the luminaires in the stadium infrastructure. In this phase, the installer also has to direct the luminaire at the desired aiming location in the field using the lighting plan orientation values.

From the luminaire location, the installer has a clear overview of the field but it is very difficult to accurately determine the aiming location in the field. To improve the accuracy of the alignment procedure, the installer can use a grid created by manually putting visual markers on the field at the required coordinates and a laser pointer aligned with the luminaire optical axis. In such a way the alignment is a matter of aiming the laser spot at the requested visually interpolated locations on the grid. In this procedure the placement of the visual markers on the field is an elaborate task and the alignment itself based on the laser spot is prone to errors.

One way to overcome such difficulties is to pre-aim the luminaires mounted on prefabricated jigs on small scale models of the lighting plan such as discussed within the U.S. Pat. No. 8,717,552. However such systems are unable to adapt to any changes to the building of the stadium. In other words it is difficult or impossible to 'fine tune' the luminaires in an effective way. It has furthermore be proposed, such as disclosed in US published application US20130268246 to attach a camera to the luminaire so that the installer is able to 'see' where the light from the luminaire will be directed by producing a 'cropped' image reflecting the modelled light pattern. This cropped image can then be compared with a further 'wide-angle' camera image to determine the location of the light beam and pattern relative to a wide-angle image and so determine whether the luminaire is directed at the required direction.

SUMMARY OF THE INVENTION

The above concern is addressed by the invention as defined by the claims.

According to an embodiment of the invention, there is provided a lighting aiming system for aiming a large area lighting system, the large area lighting system for lighting an area to be illuminated, the lighting aiming system comprising: a luminaire, the luminaire having a mounting position and an orientation and configured to generate a light beam along an optical axis; a camera configured to capture an image, the camera coupled to the luminaire and having a defined relationship between a field of view of the camera and the optical axis; a memory configured to store lighting information comprising a desired aiming location of the luminaire within the area to be illuminated, and the memory further configured to store feature information comprising an expected location of at least one feature within the area to be illuminated, which is different to the desired aiming location; a processor configured to determine and output aiming evaluation information based on the feature information, lighting information and image to enable a determination on whether the luminaire is correctly aimed. In such embodiments the luminaire can be correctly aimed by the use of an image to determine the luminaire's current aim and comparing the current aim with a stored lighting plan containing information as to the luminaire's desired aim.

The defined relationship between a field of view of the camera and the optical axis may be at least one of: a known orientation offset between the field of view of the camera and the optical axis; the field of view of the camera including the optical axis; the field of view of the camera centred on the intersection of the optical axis and a surface. In such embodiments the camera can be aligned with the optical axis and therefore 'see' the aiming point of the luminaire. Or in some situations be offset at a known orientation relative to the luminaire optical axis in order that the camera is able to apply a narrow field of view to capture an image containing a known feature which is located off the luminaire's optical axis but which can be used to aim the luminaire.

The processor configured to determine and output aiming evaluation information may be configured to generate an image position based on a mapping of the distance, within a field of view of the camera, between the desired aiming location of the luminaire, from a point of view of the camera, and the expected location of at least one feature, from a point of view of the camera, and configured to generate a graphical indicator at the image position to be applied to the image to indicate the expected location of the at least one feature within the image. In such embodiments the user or installer can see the difference between the luminaire's current aim and the expected aim by comparing the position of the feature within the image with the graphical indicator.

The processor configured to determine and output aiming evaluation information may be configured to analyse the image to determine the at least one feature within the image, to determine the feature position within the image, and to analyse the feature position within the image using the lighting information and feature information to determine and output the aiming evaluation information comprising an indicator as to whether the luminaire is correctly aimed. In such a manner the processor can identify features within the image and then use these determined features as part of the analysis. In such embodiments the processor is configured to determine the geometry behind the aiming of the luminaire and therefore to determine the location of the luminaire and/or the orientation of the luminaire by comparing the image feature locations and the expected location of the luminaire and/or orientation of the luminaire.

The aiming evaluation information may further comprise a luminaire orientation adjustment signal based on the analysis of the feature position within the image using the lighting information and feature information.

The lighting aiming system may further comprise an electronically controllable motor configured to receive the luminaire orientation adjustment signal and to actuate the luminaire based on the luminaire orientation adjustment signal such that the difference between the desired aiming position and an aiming position based on the mounting location and orientation of the luminaire is reduced. In such situations the luminaires can be aimed and changed in their aim multiple times without the need to employ expensive high level working equipment.

The lighting aiming system may further comprise a tilt sensor coupled to the luminaire, wherein the processor may be configured to determine whether the luminaire is correctly aimed in a first, around a horizontal axis, orientation based on analysing the tilt sensor output using the lighting information; and to determine whether the luminaire is correctly aimed in an second, around a vertical axis, orientation based on the aiming evaluation information. In such embodiments the tilting aiming determination and correction can be performed using the tilt sensors and significantly reduce the complexity of the pan aiming determination and correction using the camera and 'computer vision' apparatus and methods as discussed herein.

The lighting aiming system may further comprise a distance or range sensor coupled to the luminaire, wherein the processor may be configured to determine whether the luminaire is correctly aimed in a first, around a horizontal axis, orientation based on analysing the distance or range sensor output using the lighting information and to determine whether the luminaire is correctly aimed in an second, around a vertical axis, orientation based on the aiming evaluation information. In such embodiments the tilt aiming determination and correction can be performed using the range or distance sensors and significantly reduce the complexity of the pan aiming determination and correction using the camera and 'computer vision' apparatus and methods as discussed herein.

The lighting aiming system may further comprise a display, wherein the display may be configured to receive and display visual representation of information relating to the aiming evaluation information. In such a manner the user can be provided an indicator as to how to adjust the luminaire and so correctly aim it.

The display may be an augmented reality display showing a representation of the luminaire aiming location from the viewpoint of the display, the luminaire aiming location being based on the aiming evaluation information.

The at least one feature may be at least one of: at least one beacon located at determined location(s), and wherein the feature information comprises the expected location(s) of the at least one beacon; and an intrinsic 2D or 3D feature located at a defined location, and wherein the feature information comprises the location of the 2D or 3D feature.

In such embodiments the memory is configured to store information indicating an expected image with beacon position and use this to compare with the actual image captured by the camera within which the actual beacon is positioned. The difference between the expected image beacon position and the actual image beacon position may then in some embodiments be used to determine an aiming error and correction. For example the intrinsic feature may be a stadium stand arrangement, a goal post, a centre circle or centre spot mark on the field. In such a manner no additional markers or beacons are required to be placed at locations on the field.

According to a second aspect there is provided a method of aiming a large area lighting system, the large area lighting system for lighting an area to be illuminated, the method comprising: locating a luminaire in a mounting location with an orientation such that the luminaire is configured to generate a light beam along an optical axis; coupling a camera to the luminaire with a defined relationship between a field of view of the camera and the optical axis; capturing an image with the camera; storing a lighting information comprising a desired aiming position of the luminaire within the area to be illuminated; storing feature information comprising an expected location of at least one feature within the area to be illuminated, which is different to the desired aiming location; determining aiming evaluation information based on the feature information, the lighting information and the image; outputting the aiming evaluation information to enable a determination on whether the luminaire is correctly aimed.

The defined relationship between a field of view of the camera and the optical axis may be at least one of: a known orientation offset between the field of view of the camera and the optical axis; the field of view of the camera including the optical axis; the field of view of the camera centred on the intersection of the optical axis and a surface. In such embodiments the camera can be aligned with the optical axis and therefore 'see' the aiming point of the luminaire. Or in some situations the camera field of view may be offset at a known orientation relative to the luminaire optical axis in order that the camera is able to apply a narrow field of view to capture an image containing a known feature which is located off the luminaire's optical axis but which can be used to aim the luminaire.

Determining aiming evaluation information may comprise: generating an image position based on a mapping of the distance, within a field of view of the camera, between the desired aiming location of the luminaire, from a point of view of the camera, and the expected location of at least one feature, from a point of view of the camera; generating a graphical indicator at the image position; applying to the image the graphical indicator at the image position to indicate the expected position of the at least one feature within the image.

Determining the aiming evaluation information may comprise: analysing the image to determine the at least one feature within the image; determining the feature position within the image; analysing the feature position within the image using the lighting information and feature information; and generating an aiming indicator as to whether the luminaire is correctly aimed based on the analysis of the feature position within the image using the lighting information and feature information.

Determining aiming evaluation information may further comprise generating a luminaire orientation adjustment signal based on the analysis of the feature position within the image using the lighting information and feature information, and outputting aiming evaluation information comprises outputting the luminaire orientation adjustment signal.

The method may further comprise: receiving at an electronically controllable motor the luminaire orientation adjustment signal; and actuating the luminaire by the electronically controllable motor based on the luminaire orientation adjustment signal such that the difference between the desired aiming position and an aiming position based on the mounting position and orientation of the luminaire is reduced.

The method may comprise: determining whether the luminaire is correctly aimed in a first, around a horizontal axis, orientation based on analysing a tilt sensor output using the lighting information; and determining whether the luminaire is correctly aimed in a second, around a vertical axis, orientation based on the aiming evaluation information.

The method may comprise: determining whether the luminaire is correctly aimed in a first, around a horizontal axis, orientation based on analysing a range or distance sensor output using the lighting information; and determining whether the luminaire is correctly aimed in a second, around a vertical axis, orientation based on the aiming evaluation information.

The method may comprise receiving and displaying a visual representation of information relating to the aiming evaluation information on a display unit.

Displaying a visual representation of information may comprise displaying via an augmented reality display a representation of the luminaire aiming position from the viewpoint of the display, the luminaire aiming position being based on the aiming evaluation information.

The at least one feature may be at least one of: at least one beacon located at determined location(s), and wherein the feature information comprises the expected location(s) of the at least one beacon; and an intrinsic 2D or 3D feature located at a defined location, and wherein the feature information comprises the location of the 2D or 3D feature.

BRIEF DESCRIPTION OF THE DRAWINGS

Examples of the invention will now be described in detail with reference to the accompanying drawings, in which:

FIG. 7 show a flow diagram of the operation of the light aiming system according to some embodiments.

DETAILED DESCRIPTION OF THE EMBODIMENTS

The concepts as described with respect to the embodiments herein are to a lighting aiming system. In particular to a lighting aiming system to enable the direction of flood light luminaires to improve workflow efficiency. The lighting aiming system uses a camera to determine the correct aiming of a luminaire based on extracted visual landmarks or features positioned in the area to be illuminated (either introduced or intrinsic located within the area). An alignment error can furthermore be derived by analysis of the determined features (measured orientation) and with the required orientation according to the light plan. The installer can in some embodiments as described herein then be guided by a suitable audio or visual means to the measured misalignment to direct the luminaire. A similar approach can also be applied to luminaires with motorized pan-tilt units. Although the following examples have been described in particular with respect to stadia or arenas such as football stadia, it would be understood that the apparatus and methods described herein could be applied to various large scale lighting applications, such as façade lighting, shop floor lighting, parking lot lighting, or even large areas in which it is not possible to place markers on the target locations, such as lighting for swimming pool arenas, for example. The lighting system designer typically uses a virtual plane to design the light plan. In football stadiums the virtual plane is usually taken to be the football pitch. However in swimming pools the virtual plane is similar to the water level of the pool. In an empty pool it is difficult to place markers at the target location on the virtual plane and in a filled pool the marker should be (moving) floating. Similarly the apparatus and methods described herein can be applied to lighting situations where the lighting plane is uneven. For example in velodromes where the cycling floor is banked and makes a steep angle.

Figure 1:
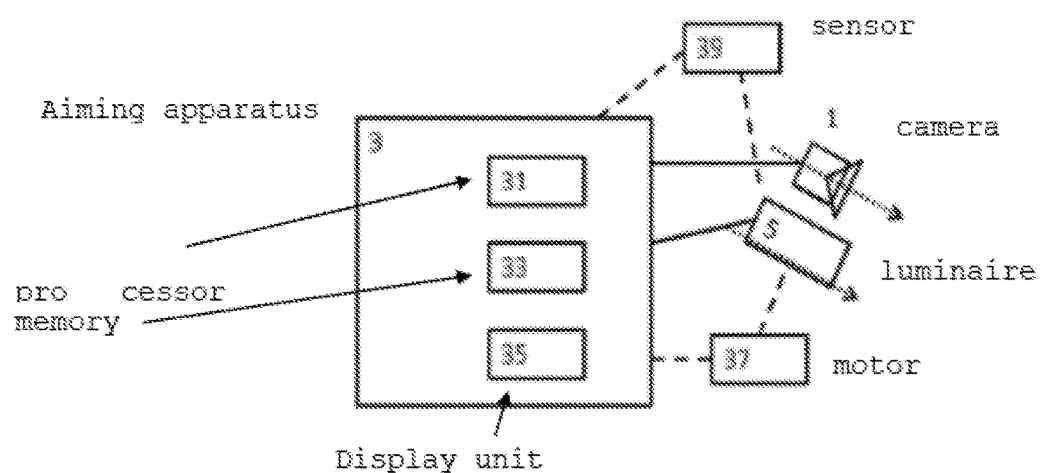
FIG. 1 shows an example lighting aiming system according to some embodiments.

With respect to FIG. 1 an example lighting aiming system is shown. The lighting aiming system shown in FIG. 1 comprises a luminaire 5 which can be any suitable luminaire type and configuration. The luminaire 5 can as described herein be mounted within the stadium via a suitable mounting point or jig. The mounting point or jig can be configured to be adjustable in order to change the orientation of the luminaire. This adjustment in some embodiments is a two dimensional adjustment. Suitable adjustments can be any two or three of the following: an orientation around a horizontal axis (a tilt adjustment); an orientation around a vertical axis (a pan adjustment); and an orientation around the optical axis of the luminaire (a roll adjustment).

The lighting aiming system can comprise a camera 1. The camera 1 can in some embodiments be coupled to the luminaire 5. The camera 1 in some embodiments is detachably coupled to the luminaire 5 on a fixing jig. In some embodiments the camera 1 can be permanently coupled or mounted on the luminaire 5 or form part of an integral luminaire assembly comprising luminaire and camera. The camera 1 is coupled to the luminaire 5 in such a manner that there is a defined relationship between a field of view of the camera and the optical axis. For example the defined relationship between the field of view of the camera and the optical axis may be that the field of view of the camera includes the optical axis of the luminaire. In other words that there is a small but known orientation offset between the field of view of the camera and the optical axis. Preferably the field of view of the camera is such that the centre of an image captured by the camera is the intersection of the optical axis of the luminaire with respect to the pitch or stadium surface. In other words that preferably the centre of the image captured by the camera is the aiming spot or point of the luminaire. However it would be understood that the defined relationship may be a known orientation offset between the field of view of the camera and the optical axis. This offset may enable the camera to have a narrow field of view to capture an image containing a known feature which is located off the luminaire's optical axis but which can be used to aim the luminaire in a manner as described herein.

The camera can be any suitable camera or imaging means configured to capture an image and pass the image to an aiming device 3. For example in some embodiments the camera 1 comprises lenses or optics to enable an adjustment of the field of view of the camera such as a zooming operation such that the camera is configured to capture a first image or set of images at a first zoom level with a wider field of view to enable coarse aiming, and a second image or set of images at a second zoom level with a narrower field of view to enable fine aiming. In the application herein the term camera should be interpreted as any image capturing apparatus including both passive and active imaging examples such as lidar devices, infra-red cameras, and should not be limited to visual wavelength cameras.

The lighting aiming system in some embodiments further comprises an aiming apparatus 3. The aiming apparatus 3 in some embodiments is configured to receive the image or image data from the camera 1 and based on the images determine whether the luminaire is correctly aimed. In some embodiments the aiming apparatus is implemented by a suitable computer or processing apparatus configured to receive (and transmit data) wirelessly or using wired or cable connections. The computer or processing device in some embodiments is a portable or mobile apparatus suitable for being carried by the installer or the luminaire system.

The aiming apparatus 3 in some embodiments therefore comprises at least one processor 31 configured to process image data received from the camera 1. The aiming apparatus 3 furthermore comprises at least one memory 33. The memory in some embodiments comprises a portion of memory allocated to storing program code or data to be run or executed on the processor 31, such as the feature determination, feature position determination, and aiming determination operations described herein. Furthermore the memory 33 in some embodiments comprises a portion of memory allocated to storing data to be processed. For example in some embodiments the memory 33 is configured to store a lighting plan or information based on the lighting plan to enable the processor 31 to determine whether the luminaire is correctly aimed. In some embodiments the memory 33 comprises information based on desired or 'aiming' orientations of the luminaire, the desired or 'aiming' location on the pitch, or any suitable information based on an 'aiming' requirement. This information can for example be determined or found from the lighting plan comprising a list or table of luminaires installed or to be installed within the stadium, the type of luminaire, the mounting or placement location of the luminaires (relative to a known datum such as the centre point or spot of the stadium), the desired orientation of the luminaire, and the desired aiming point of the luminaire (relative to the known datum). Furthermore as discussed herein in some embodiments the information based on a desired aiming location of the luminaire can be in the form of simulated or pre-determined generated images from the viewpoint of a camera (luminaire) mounted at the desired location and orientation and aimed at the desired aiming location or spot. The memory 33 in some embodiments may comprise information based on any features to be used in the aiming operations. As will be described hereafter the features can be intrinsic to the architecture or structure within which the lighting effect is being generated, for example features within the stadium. In some embodiments the features are aiming or target features to be located at known or determined locations. Thus for example any parameters associated with the features (aiming, target or intrinsic) are stored in the memory 33. These can for example be the location, the shape, size, colour or light pattern of the feature.

The memory 33 can be any suitable memory, such as semiconductor memory and in some embodiments the memory 33 comprises at least one part volatile memory and one part non-volatile memory. In some embodiments at least part of the memory is located separate from the aiming apparatus 3. For example in some embodiments a part of the memory, such as the memory comprising the lighting plan or information based on the lighting plan, is located on a server remote from the aiming apparatus 3 and can be retrieved by the processor 33 via a suitable data connection.

The processor 31 can therefore be configured to receive image data from the camera 1. In some embodiments the processor is further configured to receive the lighting information and the feature information. The processor 31 can then analyse the image data, the lighting information and the feature information and determine and output aiming evaluation information based on the analysis to enable a determination on whether the luminaire is correctly aimed. For example in some embodiments the processor can be configured to generate an image position (or an image offset from a defined position in an image) based on a mapping of the distance between the desired aiming location of the luminaire and the expected location of at least one feature with respect to the image viewpoint. Having determined an image position the processor can then generate a graphical indicator at the image position to be applied to the image to indicate the expected position of the at least one feature within the image. Although it would be understood that within the following description the terms location and position are interchangeable. For clarity reasons the term location is used with respect to a physical location or position, such as the aiming location or the location of the feature within the stadium, and the term position is used with respect to a camera image or information within the image or based on the image. When the graphical indicator is aligned with the feature then the luminaire is correctly aimed. Furthermore the installer or user can, when the graphical indicator does not align with the feature on the image, attempt to adjust the luminaire to align the graphical indicator with the feature on the image.

In some embodiments the processor 31 can furthermore be configured to perform image processing and analyse the image to determine the at least one feature within the image. As described hereafter the feature can for example be a visual marker or beacon placed upon the field or can be determined based on the intrinsic structure or configuration of the stadium or pitch.

The processor 31 furthermore is configured to determine the position of the feature(s) within the image. Furthermore the position is defined in some embodiments relative to a known point or locus. For example in some embodiments the position of the feature(s) is determined relative to the centre point of the image however it would be understood that in some embodiments the position of the feature(s) is determined relative to one of the corners or edges of the image.

The processor 31, having determined the position of the feature(s) can then be configured to determine or analyse the position of the feature or features within the image using the lighting information and the feature information. The processor 31 can use this analysis to generate and output aiming evaluation information to enable a determination of whether or not the luminaire is correctly aimed. For example the processor 31 can determine the image position (or an image offset from a defined position in an image) between the feature in the image and an expected feature position and generate aiming evaluation information or an aiming or orientation adjustment signal further based on the analysis.

In some embodiments the aiming apparatus further comprises a display unit 35. The display unit can be any suitable display technology suitable for providing a visual or graphical indicator to the installer or user of the aiming apparatus 3. In some embodiments the display unit is a detachable or separate part from the aiming apparatus and configured to receive the aiming evaluation information (such as the orientation adjustment signal) and display a visual representation of information relating to the aiming evaluation information. In some embodiments the display unit 35 can receive the image captured by the camera and overlay the aiming evaluation information such as the visual or graphical indicator. In some embodiments the image can furthermore be processed. For example the determined features can be visually enhanced.

In some embodiments the display unit can be implemented as an application or program operating on a tablet computer, mobile device or mobile phone. In some embodiments the display technology is an augmented reality display such as for example augmented reality glasses.

In some embodiments the aiming evaluation information can be processed by the apparatus is and output via an audible output apparatus, such as a speaker or headphone. The audible output of the aiming evaluation information may in some embodiments compliment the visual or graphical output and further indicate to the installer or user whether the luminaire is correctly aimed. For example a headset could attempt to produce a spatial audio source signal indicating to the installer or user a rotation around the vertical axis. Thus a left spatial signal could indicate an adjustment to the left and a right spatial signal indicate an adjustment to the right.

In some embodiments the lighting aiming system further comprises a controllable motor 37 configured to receive the orientation adjustment signal. The motor, for example a stepper motor, can be configured to move or actuate the luminaire 5 to reduce any aiming error. In such embodiments the luminaire 5 can be mounted on a tilt and pan gimbal which is actuated or moved by the electronically controlled motor 37. The controllable motor 37 can furthermore in some embodiments move or actuate the luminaire in a roll orientation. Although most luminaires have a rotation invariant light projection with respect to the optical centre and therefore it is not always necessary to adapt the mechanical roll angle, a roll movement can produce an effect for asymmetric light projection modules. In some embodiments the mechanical roll can be measured with a tilt device like an accelerometer in the plane perpendicular to the optical axis and an alignment grid overlay as part of the aiming evaluation information can be generated and projected on the input image so that the user can detect any misalignment and correct the role angle accordingly.

In some embodiments the lighting aiming system further comprises additional sensors 39. For example in some embodiments the lighting aiming system comprises a tilt sensor coupled to the luminaire 5 and configured to determine a horizontal axis (tilt) orientation value which can be passed to the processor 31. In such embodiments the processor 31 can be configured to receive the tilt sensor output and determine whether the luminaire is correctly aimed around a horizontal axis orientation by analysing the tilt sensor output using the information stored in the memory 33, such as comparing the measured tilt angle and the desired tilt angle for the luminaire. Furthermore in such embodiments the processor 31 can be configured to determine whether the luminaire is correctly aimed around a vertical axis orientation (a pan orientation) based on the analysis of the image and the information stored in the memory 33 as discussed herein. In such a manner the image analysis as discussed herein is simplified as the tilt orientation is determined separately and does not need to be determined from the analysis of the image using the information stored in the memory. In some embodiments the use of the tilt sensor can be configured to check or calibrate the determination of whether the aiming of the luminaire is correct based on the analysis of the image as discussed herein. Furthermore in some embodiments the use of the tilt sensor can be combined with the analysis of the image as discussed herein to more accurately determine the aiming of the luminaire.

Similarly in some embodiments of the lighting system further comprises a range or distance sensor mounted on the luminaire 5 and configured to determine a distance or range from the luminaire to the aiming position or point. In such embodiments the processor 31 can receive the output of the distance or range sensor and analyse this based on the information in the memory 33 in order to determine the horizontal or tilt orientation. In such embodiments the processor 31 can be configured to receive the range or distance sensor output and determine whether the luminaire is correctly aimed around a horizontal axis orientation by analysing the range or distance sensor output using the information stored in the memory 33, such as comparing the measured distance or range against an expected distance between the luminaire and the aiming position or spot. Furthermore in such embodiments the processor 31 can be configured to determine whether the luminaire is correctly aimed around a vertical axis orientation (a pan orientation) based on the analysis of the image and the information stored in the memory 33 as discussed herein. In such a manner the image analysis as discussed herein is simplified as the tilt orientation is determined separately and does not need to be determined from the analysis of the image using the information stored in the memory. In some embodiments the use of the range or distance sensor can be configured to check or calibrate the determination of whether the aiming of the luminaire is correct based on the analysis of the image as discussed herein. Furthermore in some embodiments the use of the range or distance sensor can be combined with the analysis of the image as discussed herein to more accurately determine the aiming of the luminaire.

In the following examples the processor generates the aiming evaluation information based on the image processing embodiments described above. However it would be understood that the following apparatus can be configured to generate the aiming evaluation information in the form of the image position applied to the image. In other words generating and outputting aiming evaluation information by generating an image position based on mapping of the distance between the desired aiming location of the luminaire and the expected location of at least one feature with respect to the image viewpoint in a manner as described herein. Once an image position is determined then a graphical indicator is applied to the image at the image position to indicate the expected position of the at least one feature within the image.

In some embodiments the processor 31 can furthermore be configured to perform image processing and analyse the image to determine the at least one feature within the image.

Figure 2:
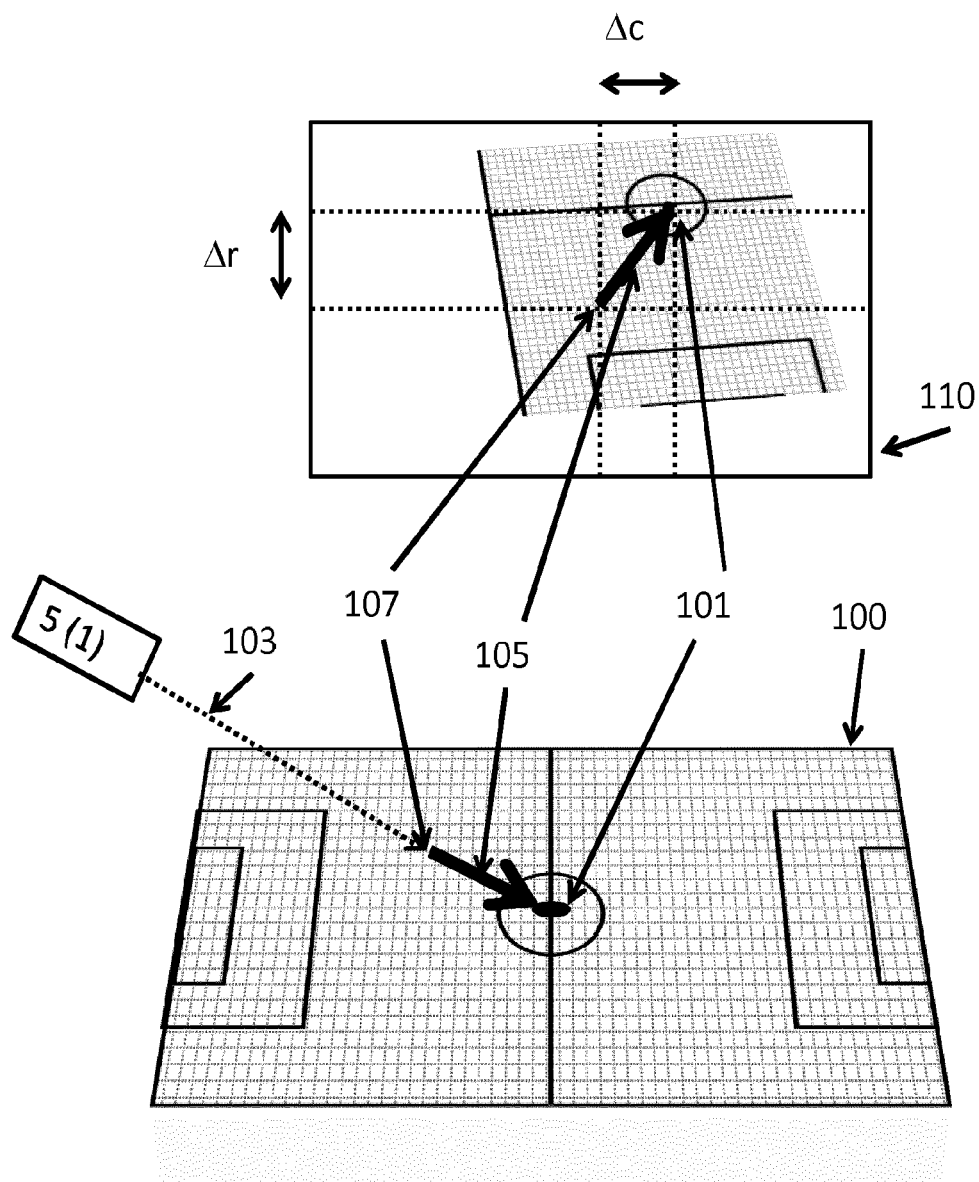
FIG. 2 shows an example lighting aiming system in operation according to a first set of embodiments.

With respect to FIG. 2, an example operation of the lighting aiming system is shown according to first set of embodiments. The stadium is represented in FIG. 2 by a football field 100 and an example luminaire 5 (coupled to a camera 1) having an optical axis or aiming direction 103 which intersects with the football field 100 at an aiming location or point 107 on the surface of the field. The luminaire 5 in this example is located at an a priori known luminaire location (x,y,z:X1,Y1,Z1) but has an unknown or yet undetermined accurately horizontal and vertical orientation.

Furthermore located on the field is at least one visual marker 101 at a known location. In this example a single visual marker 101 is located at the centre spot of the field (x,y,z:0,0,0). The visual marker can be any suitable object such as a ball, a reflector, or an active light source or beacon. It would be understood that a beacon could be defined both as an active and passive beacon. Furthermore the term beacon and visual indicator should not be limited to the human visual range of wavelengths but with regards to the camera sensor sensitivity range. In some embodiments different objects may have different characteristics such as different colours or shape of markers, or coded (pulsed) light sources in order to enable the visual markers to be distinguished from each other.

The camera 1 coupled or mounted to the luminaire 5 can be configured to capture an image as described herein and shown in FIG. 2 as image 110. The image 110, in this example, has a centre of image which shows the aiming spot or point 107. The camera can in some embodiments pass this image to the processor 31.

The processor 31 can then be configured to analyse the image 110 to determine a feature (which in this example is the visual marker 101). The determination of the visual indicator can be based on any known parameter such as colour, shape, size or beacon pattern. For example the image can be colour filtered to identify the visual indicator having a specific colour, or the image can be processed to determine a specific shape. Having determined the feature (visual marker 101) within the image 110 the processor can then be configured to determine the visual marker 101 position within the image 110. In the example shown herein the position within the image 110 is determined based on the number of pixel rows (vertical offset) Δr and the number of pixel columns (horizontal offset) Δc from the centre of the image (representing the aiming spot or point) 107.

In some embodiments the processor 31 can be configured to use the offset (the number of rows of pixels and columns of pixels) from the centre of the image to define a vector line 105 originating at the position on the image plane through the optical axis ending at the marker location in the field. This vector 105 can, in some embodiments be used to derive an estimation of the rotation angles around the row and column direction with respect to the optical axis, or in other words to determine an estimate of the orientation(s) of the luminaire, knowing the relative locations of the luminaire, the feature (or visual marker), and the 'distance' between the aiming point and the feature.

In such situations the processor 31 can furthermore retrieve from the lighting plan, or information based on the lighting plan the expected or desired orientation(s) of the luminaire. The processor can compare the determined or measured orientation(s) with the expected orientation(s) and therefore determine whether the luminaire is correctly aimed or not. Furthermore from the difference between the determined or measured orientation(s) with the expected orientation(s) the processor can furthermore generate a correction or orientation adjustment signal to be passed to the display unit or to the motor as described herein.

In some embodiments at least some of the geometry calculations can be performed prior to the determination of whether the luminaire is correctly aimed. For example in some embodiments the processor 31 can for example use the information based the lighting plan expected luminaire location, orientation(s) and potentially the aiming spot with respect to the field, the location of the visual indicator and with knowledge on the camera field of view pre-determine an expected image offset or position. Furthermore in some embodiments the lighting plan can itself comprise an expected image offset value or position. In such embodiments the processor 31 can then compare the expected image offset values or positions against the determined image offset values or positions in order to determine whether the luminaire is correctly aimed or not. Furthermore from the difference between the expected and determined image offsets or positions can furthermore be used to generate a correction or orientation adjustment signal to be passed to the display unit or to the motor as described herein.

In some further embodiments the expected image offset or position can be generated as a simulated image comprising a simulated visual marker at the expected image offset or image position which can be overlaid with respect to the captured image and presented to the user of the display unit. The displayed simulated visual marker can be used to inform the installer or user of the aiming apparatus by means of a suitable graphical user interface the correct luminaire orientation.

Figure 3:
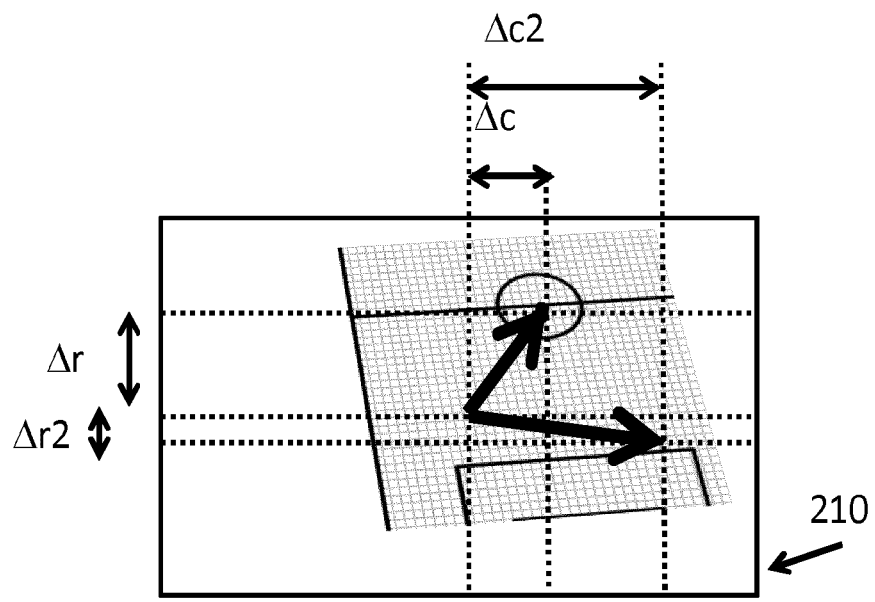
FIG. 3 shows an example lighting aiming system in operation according to a second set of embodiments.
Figure 3:
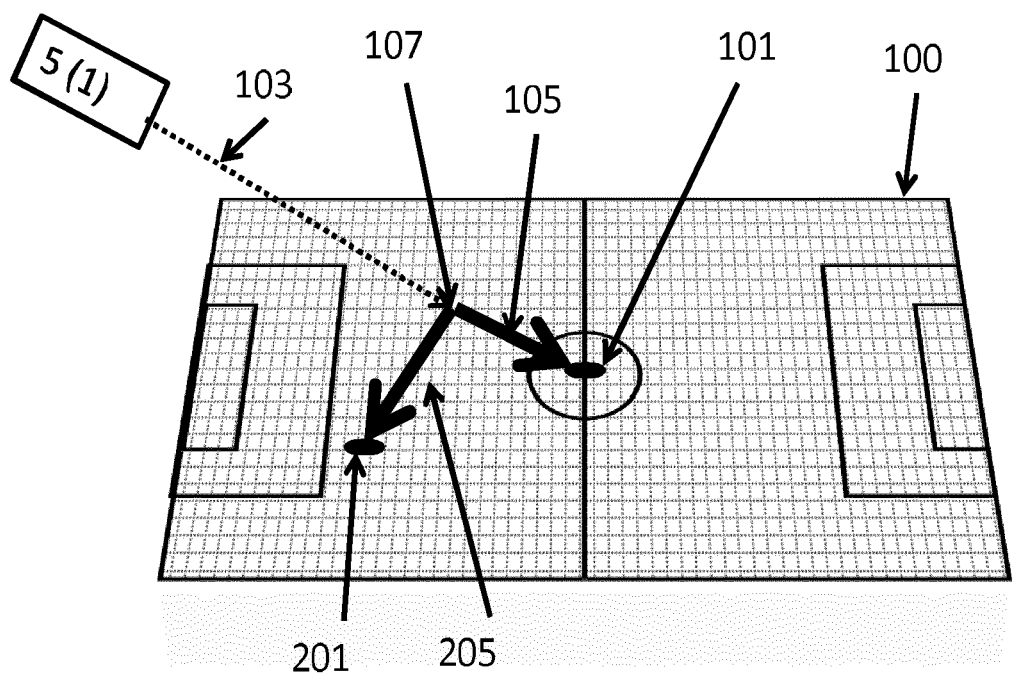

With respect to FIG. 3 an example of the lighting aiming system is shown according to a second set of embodiments. Whereas in the example shown in FIG. 2 there was a single visual indicator, in this example multiple visual markers (or beacons) at known locations are placed in the field. This is shown with respect to FIG. 3 by the field having a second visual marker 201 located at a second known position (x,y,z:X2,Y2,Z2).

The processor 31 can receive the image 210. The image 210 captured by the camera 1 shows both of these visual markers 101, 201. The processor can then furthermore determine the 'features' or visual markers 201, 101. The processor 31 can then determine the position of the visual markers with respect to the captured image. This is once again shown in the image 210 where the first visual marker 101 has Δr pixel rows (vertical) offset and the Δc pixel columns (horizontal) offset from the centre of the image (representing the aiming spot or point) 107 and the second visual marker 201 has Δr2 pixel rows (vertical) offset and the Δc2 pixel columns (horizontal) offset from the centre of the image (representing the aiming spot or point) 107. In such a manner the processor can then determine the displacement vectors 105, 205. The processor 31 can furthermore analyse these vectors 105, 205 to derive an estimation of the rotation angles around the row and column direction with respect to the optical axis. In other words the processor can determine an estimate of the orientation(s) of the luminaire, knowing the relative locations of the luminaire, the feature (or visual marker), and the 'distance' between the aiming point and the feature known location. The use of multiple features is advantageous as it permits an average aiming position to be determined with the ability to reduce any error introduced by a single measurement. Furthermore with sufficient numbers of features or visual indicators determined the processor 31 can furthermore estimate further parameters associated with the luminaire, such as luminaire rotation orientation (which is useful for non-symmetrical light pattern aiming), or estimating the camera location within the stadium (in other words the luminaire location within the stadium). Thus for example with two features or visual markers a rotation around the optical axis can be estimated, while in case of one feature (marker) this roll rotation is assumed to be zero and thus neglected. For luminaire location, 4 features or (beacons) in the 2D image are required. Where range or distance data is available for the features only three beacons are required to derive a luminaire location. Where the 2D orientation of the plane of the field can also be determined then only 2 features in the image are needed in order to estimate or extract the luminaire location. This information can in some embodiments be directly estimated or extracted by, for example, analysis of a 3D image from a 2D laser scanner.

The processor 31 can in some embodiments use the estimated luminaire location to determine the identity of the luminaire from the image alone. Thus in some embodiments the processor need not know the location of the luminaire but determine the location based on the image and from this location use the lighting plan or information based on the lighting plan location to identify the luminaire and then determine from the lighting plan or the information based on the lighting plan the expected associated aiming location and/or expected orientation estimation.

The processor 31 can then compare the expected aiming location and/or expected orientation(s) against the determined aiming location and/or orientation(s) to determine whether the identified luminaire is correctly aimed. As described previously this analysis of the feature position within the image using the information based on the lighting plan to determine whether the luminaire is correctly aimed can for example be a comparison of the determined orientation(s), or determined image displacement(s), or simulated image(s) of expected visual markers overlaid on the captured image.

Figure 4:
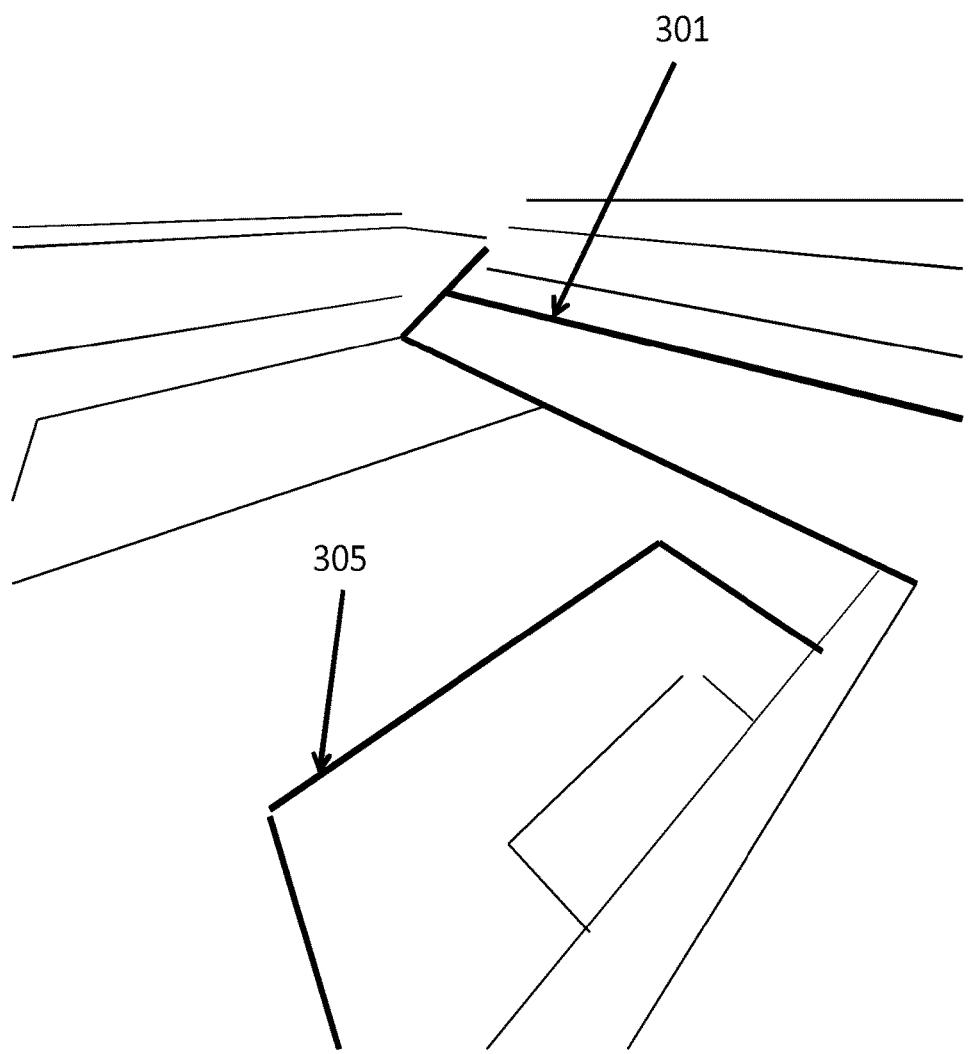
FIG. 4 shows an example lighting aiming system in operation determining at least one 2D and one 3D example feature within a stadium according to some embodiments.

Although the example shown with respect to FIGS. 2 and 3 use visual markers placed on known locations of the field it would be understood that in some embodiments the image can be analysed to determine inherent or intrinsic 2-dimensional or 3-dimensional features. For example FIG. 4 shows an example edge detection filtered image from a camera. Within this image is shown two possible intrinsic features which can be used as reference features with known locations within the stadium. FIG. 4 shows an example 2-dimensional feature in the form of the field marking of the penalty box 305. The markings on the field are made at known locations and with known sizes and the image comprising these can be used to determine a point on the feature suitable for generating a suitable image displacement vector. Furthermore an example 3-dimensional feature shown in FIG. 4 is a stadium seating lower tier 301 edge. It would be understood that a stadium would have many such features which could be identified with known locations and then determined within image. For example the intrinsic features could also be the floodlight luminaires themselves since in the light plan the location of each luminaire is known. Therefore, observed luminaires could be used as passive or active landmark. By activation (static or coded light) of a specific luminaire a beacon can be created for the observing camera. Based on the location of the luminaire to be directed, a luminaire can be activated as a beacon on the location resulting in a better aiming precision. The aiming tool or apparatus in some embodiments could therefore indicate the beacon luminaire resulting in the highest aiming precision. In such embodiments using the stadium lights may result in the optical axis of the luminaire and camera being non-aligned or offset. Capturing images of the stadium lights mounted high above the field as well as the target locations on the field could require a very large field of view. In such embodiments therefore there may be a defined mechanical offset between the optical axis of the luminaire and a field of view of the camera system in such way that the luminaires can be observed by the camera regardless of the luminaire target location on the field.

Subsequently the luminaire can be activated manually by an operator or automatically by the system. It would be understood that in some embodiments as many of these shapes have defined straight or substantially straight lines any optical perspective effects can be determined and allowed for.

In such embodiments the processor 31 can be configured to extract the feature or object with a unique 2-dimensional or 3-dimensional shape according to any known technique or method.

Figure 5:
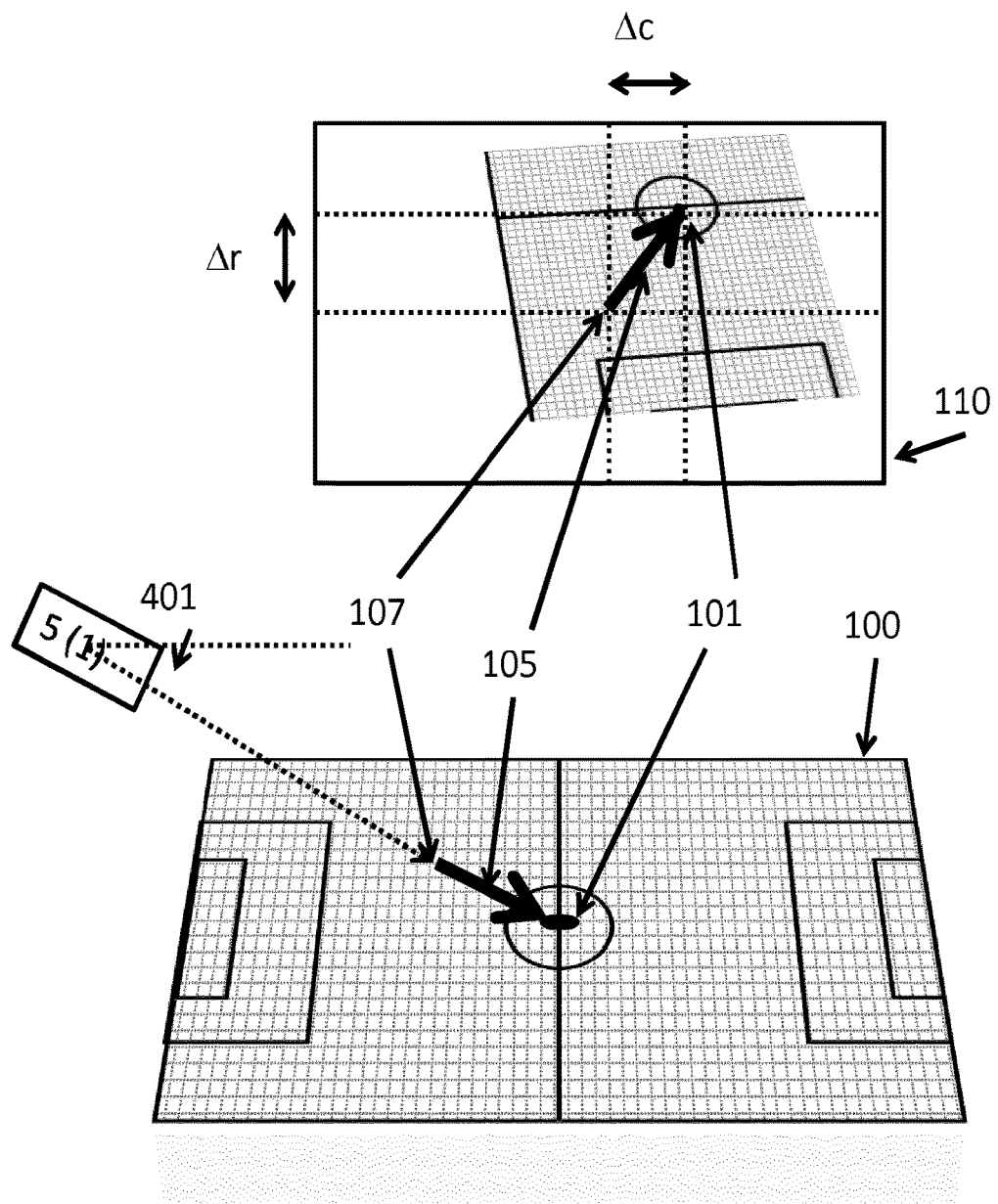
FIG. 5 shows an example lighting aiming system using an additional tilt sensor according to some embodiments.

With respect to FIG. 5 a further example of the lighting aiming system is shown according to a further set of embodiments. In this example the aiming system comprises a tilt sensor configured to determine a tilt angle 401. The tilt sensor can as described herein be used as a complimentary way to determine the orientation angle of the luminaire. For example the tilt sensor can in some embodiments be used to measure the rotation around the horizontal axis and therefore reduce the complexity of the analysis required to determine whether the luminaire is correctly aimed from the image.

Figure 6:
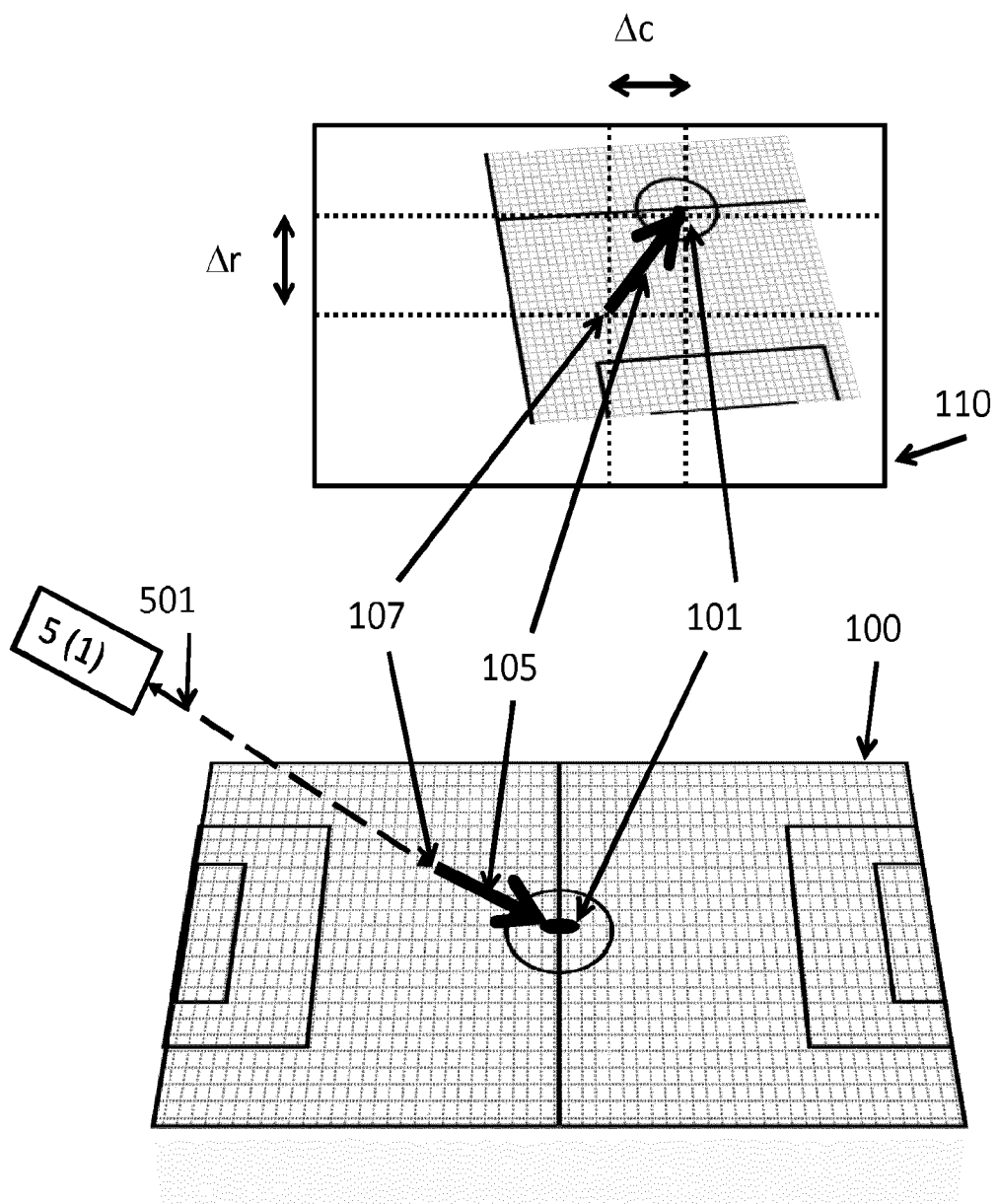
FIG. 6 shows an example lighting aiming system using an additional distance or range sensor according to some embodiments.

With respect to FIG. 6 a further example of the lighting aiming system is shown where the aiming system comprises a range or distance sensor configured to determine a range or distance 501 between the luminaire or camera and the aiming spot 107. In the following application the term range or distance sensor is defined as any suitable means for determining the range or distance from the luminaire or camera to a defined location. In some embodiments the sensor may measure the distance directly. However in some embodiments the sensor may measure the distance indirectly. The defined location can for example be the aiming point of the luminaire or camera or the feature. As described herein the distance or range sensor output can be used as a complimentary way to determine the orientation angle of the luminaire. For example the range or distance sensor can in some embodiments be used to determine a distance to an aiming spot and knowing the location (or at least the height) of the luminaire determine the orientation or rotation around the horizontal axis using simple trigonometry. In such embodiments the complexity of the analysis required to determine whether the luminaire is correctly aimed can be reduced as only the orientation around the vertical axis is then needed to be determined which therefore simplifies the estimation by a single dimension. In some embodiments rather than using a single element to measure the distance on the optical axis, the range sensor can also be a matrix of range or distance sensors. Using an array/matrix of range sensing elements has the advantage that the orientation of the luminaire with respect to the ground plane can be determined directly. The range sensor in some embodiments could be implemented by a line scan laser scanner that scans around the horizontal axis. With a 2-dimensional laser scanner or time-of-flight camera is possible to measure the orientation of the ground plane by surface fitting. Also, the range matrix sensor can be used to detect beacons based on their 3D shape properties and therefore used to align the luminaire with respect to the vertical axis. In other words in some embodiments the camera can be replaced by or complemented with the array/matrix of range sensing elements operating as an image generator (where the image generated further has depth or distance information). Furthermore it would be understood that in some embodiments the range or distance between the luminaire and a feature, such as a beacon, can be indirectly determined by using the image. For example the feature within the image is measured and compared to its actual or known size (in meters). In such embodiments as the properties of the optical system are known the distance can be derived from the scale of the beacon (magnification factor) in the image.

With respect to FIG. 7 an example method of operation of the lighting aiming system is described. As described herein the camera 1 can be configured to determine or capture an image having being mounted or coupled to the luminaire and preferably located such that the centre of the field of view reflects the optical axis of the luminaire. In other words that the centre point of the luminaire beam is also the centre point of the image.

The operation of capturing an image from the camera is shown in FIG. 7 by step 601.

The processor 31 in some embodiments can then be configured to receive the image and determine from the image at least one suitable feature. As discussed herein in some embodiments the feature is a visual marker located at known positions on the field and in some embodiments is a feature determined from the implicit or inherent structure or configuration of the stadium (such as the field markings, the stadium architecture etc). In some embodiments a single feature is determined however it would be understood that any number of features can be determined and that the more features determined the more accurate an estimation of the luminaire location and orientation can be estimated.

The operation of determining at least one feature from the image is shown in FIG. 7 by step 603.

The processor can then be configured to determine the position of the feature(s) within the image. As discussed herein the position can be relative to the centre point of the image or to any suitable locus such as the corners, or edges of the image.

The operation of determining the position of the feature(s) within the image is shown in FIG. 7 by step 605.

The processor having determined the position of the feature(s) within the image can analyse this information using the information based on the lighting plan (such as the expected or desired luminaire location, orientation, and/or aiming location). In some embodiments this can comprise determining the geometry of the luminaire (the luminaire location, orientation, and/or aiming location) based on the image feature locations and comparing this determined luminaire location and/or orientation with the stored lighting plan expected location and/or orientation information. In some embodiments the processor can determine an estimated displacement from the viewpoint of the luminaire between a desired aiming point and the feature (such as the visual marker at a known position) and compare this estimated displacement with the determined displacement from the image in order to determine whether or not the luminaire has been correctly aimed (and furthermore potential corrective orientation motion). In some embodiments the processor can determine a simulated image or retrieve a simulated image from memory of the viewpoint of a camera based on the desired aiming point for the luminaire.

The operation of retrieving the information based on the lighting plan from the memory is shown in FIG. 7 step 607.

The operation of analysing the determined position of the features within the image using the information in order to determine whether the luminaire is correctly aimed is shown in FIG. 7 by step 609.

When the luminaire is correctly aimed then the operation can stop.

The operation of stopping the lighting aiming system method is shown in FIG. 7 by step 611.

When the luminaire is inaccurately aimed then the processor in some embodiments can be configured to generate a suitable orientation adjustment signal or aiming evaluation information. The aiming evaluation information can in some embodiments be a suitable graphical user interface signal for example an image overlay to be displayed on a display unit with the captured image from the camera, an audio feedback signal, or a haptic feedback (vibration) signal to be passed to the installer for use. In some environments as described herein the suitable orientation signal can be sent to a motor to adjust the orientation of the luminaire directly.

The operation of generating a suitable orientation adjustment signal is shown in FIG. 7 by step 613.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting aiming system for aiming a large area lighting system, the large area lighting system for lighting an area to be illuminated, the lighting aiming system comprising:
    a luminaire, the luminaire having a mounting location and an orientation and configured to generate a light beam along an optical axis;
    a camera configured to capture an image, the camera coupled to the luminaire and having a defined relationship between a field of view of the camera and the optical axis;
    a memory configured to store lighting information corresponding to a desired aiming location of the luminaire within the area to be illuminated, and the memory further configured to store feature information comprising an expected location of at least one feature within the area to be illuminated, which is different to the desired aiming location; and
    a processor configured to determine and output aiming evaluation information based on the feature information, lighting information and image to enable a determination on whether the luminaire is correctly aimed;
    wherein the processor is configured to analyse the image to determine the at least one feature within the image, to determine the feature position within the image, and to analyse the feature position within the image using the lighting information and feature information to determine and output the aiming evaluation information comprising an indicator as to whether the luminaire is correctly aimed.

2. A lighting aiming system as claimed in claim 1, wherein the lighting system is for aiming one of: an arena or stadium lighting system, a façade lighting system, a shop floor lighting system, or a parking lot lighting system.

3. The lighting aiming system as claimed in claim 1, wherein the processor configured to determine and output aiming evaluation information is configured to generate an image position based on a mapping of the distance within a field of view of the camera between the desired aiming location of the luminaire, from a point of view of the camera, and the expected location of at least one feature, from a point of view of the camera, and configured to generate a graphical indicator at the image position to be applied to the image to indicate the expected position of the at least one feature within the image.

4. The lighting aiming system as claimed in claim 1, wherein the aiming evaluation information further comprises a luminaire orientation adjustment signal based on the analysis of the feature position within the image using the lighting information and feature information.

5. The lighting aiming system as claimed in claim 4, further comprising an electronically controllable motor configured to receive the luminaire orientation adjustment signal and to actuate the luminaire based on the luminaire orientation adjustment signal such that the difference between the desired aiming location and an aiming location based on the mounting location and orientation of the luminaire is reduced.

6. The lighting aiming system as claimed in any of claim 1, further comprising a tilt sensor coupled to the luminaire, wherein the processor is configured to determine whether the luminaire is correctly aimed in a first, around a horizontal axis, orientation based on analysing the tilt sensor output using the lighting information; and determine whether the luminaire is correctly aimed in a second, around a vertical axis, orientation based on the aiming evaluation information.

7. The lighting aiming system as claimed in any of claim 1, further comprising a distance or range sensor coupled to the luminaire, wherein the processor is configured to determine whether the luminaire is correctly aimed in a first, around a horizontal axis, orientation based on analysing the distance or range sensor output using the lighting information and determine whether the luminaire is correctly aimed in a second, around a vertical axis, orientation based on the aiming evaluation information.

8. The lighting aiming system as claimed in any of claim 1, further comprising a display, wherein the display is configured to receive and display a visual representation of information related to the aiming evaluation information, for example wherein the display is an augmented reality display showing a representation of the luminaire aiming location from the viewpoint of the display, the luminaire aiming location being based on the aiming evaluation information.

9. The lighting aiming system as claimed in claim 1, wherein the at least one feature is at least one of:
    at least one beacon located at determined location(s), and wherein the feature information comprises the expected location(s) of the at least one beacon; and
    an intrinsic 2D or 3D feature located at a defined location, and wherein the feature information comprises the location of the 2D or 3D feature.

10. A method of aiming a large area lighting system, the large area lighting system for lighting an area to be illuminated, the method comprising:
    locating a luminaire in a mounting location with an orientation such that the luminaire is configured to generate a light beam along an optical axis;
    coupling a camera to the luminaire with a defined relationship between a field of view of the camera and the optical axis;
    capturing an image with the camera;
    storing a lighting information comprising a desired aiming location of the luminaire within the area to be illuminated;
    storing feature information comprising an expected location of at least one feature within the area to be illuminated, which is different to the desired aiming location;
    determining aiming evaluation information based on the feature information, the lighting information and the image; and
    outputting the aiming evaluation information to enable a determination on whether the luminaire is correctly aimed; and
    wherein determining the aiming evaluation information comprises:

analysing the image to determine the at least one feature within the image;

determining the feature position within the image;

analysing the feature position within the image using the lighting information and feature information; and generating an aiming indicator as to whether the luminaire is correctly aimed based on the analysis of the feature position within the image using the lighting information and feature information.

11. The method as claimed in claim 10, wherein determining aiming evaluation information comprises:

generating an image position based on a mapping of the distance within a field of view of the camera between the desired aiming location of the luminaire, from a point of view of the camera, and the expected location of at least one feature, from a point of view of the camera;

generating a graphical indicator at the image position;

applying to the image the graphical indicator at the image position to indicate the expected location of the at least one feature within the image.

12. The method as claimed in any of claim 10, to wherein determining aiming evaluation information further comprises generating a luminaire orientation adjustment signal based on the analysis of the feature position within the image using the lighting information and feature information, and outputting aiming evaluation information comprises outputting the luminaire orientation adjustment signal.

13. The method as claimed in claim 12, further comprising:

receiving at an electronically controllable motor the luminaire orientation adjustment signal; and actuating the luminaire by the electronically controllable motor based on the luminaire orientation adjustment signal such that the difference between the desired aiming location and an aiming location based on the mounting location and orientation of the luminaire is reduced.

14. The method as claimed in claim 10, wherein the least one feature is a number of one to four features.

15. The lighting aiming system as claimed in claim 1, wherein the least one feature is a number of one to four features.

* * * * *